United States Patent
Sutivong et al.

(10) Patent No.: US 7,197,692 B2
(45) Date of Patent: Mar. 27, 2007

(54) ROBUST ERASURE DETECTION AND ERASURE-RATE-BASED CLOSED LOOP POWER CONTROL

(75) Inventors: Arak Sutivong, San Diego, CA (US); Avneesh Agrawal, San Diego, CA (US); David Jonathan Julian, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 124 days.

(21) Appl. No.: 10/890,717

(22) Filed: Jul. 13, 2004

(65) Prior Publication Data

US 2005/0283715 A1 Dec. 22, 2005

Related U.S. Application Data

(60) Provisional application No. 60/580,819, filed on Jun. 18, 2004.

(51) Int. Cl.
*H03M 13/03* (2006.01)
(52) U.S. Cl. .................. 714/796; 714/752; 375/262; 375/341
(58) Field of Classification Search .......... 714/752, 714/786, 796; 375/262, 341
See application file for complete search history.

(56) References Cited

U.S. PATENT DOCUMENTS

| | | | |
|---|---|---|---|
| 5,406,613 A * | 4/1995 | Peponides et al. ......... 455/574 |
| 5,815,507 A | 9/1998 | Vinggaard et al. ........... 371/5.1 |
| 6,012,160 A | 1/2000 | Dent .......................... 714/786 |
| 6,154,659 A * | 11/2000 | Jalali et al. ................. 455/522 |
| 6,181,738 B1 * | 1/2001 | Chheda et al. .............. 375/224 |
| 6,208,699 B1 | 3/2001 | Chen et al. ................. 375/340 |
| 6,446,236 B1 * | 9/2002 | McEwen et al. ............ 714/795 |
| 6,560,774 B1 * | 5/2003 | Gordon et al. ............. 717/146 |
| 6,721,373 B1 * | 4/2004 | Frenkel et al. .............. 375/346 |

FOREIGN PATENT DOCUMENTS

WO        0120808        3/2001

* cited by examiner

*Primary Examiner*—Albert Decady
*Assistant Examiner*—Esaw Abraham
(74) *Attorney, Agent, or Firm*—Thomas R. Rouse; Sandip (Micky) S. Minhas; Milan I. Patel (57) ABSTRACT

Techniques for performing erasure detection and power control for a transmission without error detection coding are described. For erasure detection, a transmitter transmits codewords via a wireless channel. A receiver computes a metric for each received codeword, compares the computed metric against an erasure threshold, and declares the received codeword to be "erased" or "non-erased". The receiver dynamically adjusts the erasure threshold based on received known codewords to achieve a target level of performance. For power control, an inner loop adjusts the transmit power to maintain a received signal quality (SNR) at a target SNR. An outer loop adjusts the target SNR based on the status of received codewords (erased or non-erased) to achieve a target erasure rate. A third loop adjusts the erasure threshold based on the status of received known codewords ("good", "bad", or erased) to achieve a target conditional error rate.

33 Claims, 6 Drawing Sheets

ROBUST ERASURE DETECTION AND ERASURE-RATE-BASED CLOSED LOOP POWER CONTROL

CLAIM OF PRIORITY UNDER 35 U.S.C. §119

The present Application for Patent claims priority to Provisional Application No. 60/580,819 entitled "Reverse-Link Power Control Algorithm" filed Jun. 18, 2004, and assigned to the assignee hereof and hereby expressly incorporated by reference herein.

BACKGROUND

I. Field

The present invention relates generally to data communication, and more specifically to techniques for performing erasure detection and power control in a wireless communication system.

II. Background

A wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations.

Multiple terminals may simultaneously transmit on the reverse link by multiplexing their transmissions to be orthogonal to one another. The multiplexing attempts to achieve orthogonality among the multiple reverse link transmissions in time, frequency, and/or code domain. Complete orthogonality, if achieved, results in the transmission from each terminal not interfering with the transmissions from other terminals at a receiving base station. However, complete orthogonality among the transmissions from different terminals is often not realized due to channel conditions, receiver imperfections, and so on. The loss in orthogonality results in each terminal causing some amounts of interference to other terminals. The performance of each terminal is then degraded by the interference from all other terminals.

On the reverse link, a power control mechanism may be used to control the transmit power of each terminal in order to ensure good performance for all terminals. This power control mechanism is normally implemented with two power control loops, which are often called an "inner" loop and an "outer" loop. The inner loop adjusts the transmit power of a terminal such that its received signal quality (SNR), as measured at a receiving base station, is maintained at a target SNR. The outer loop adjusts the target SNR to maintain a desired block error rate (BLER) or packet error rate (PER).

The conventional power control mechanism adjusts the transmit power of each terminal such that the desired block/packet error rate is achieved for the reverse link transmission from the terminal. An error detection code, such as a cyclic redundancy check (CRC) code, is typically used to determine whether each received data block/packet is decoded correctly or in error. The target SNR is then adjusted accordingly based on the result of the error detection decoding. However, an error detection code may not be used for some transmissions, e.g., if the overhead for the error detection code is deemed excessive. A conventional power control mechanism that relies on an error detection code cannot be used directly for these transmissions.

There is therefore a need in the art for techniques to properly adjust transmit power for a transmission when error detection coding is not used.

SUMMARY

Techniques for performing erasure detection and power control for a transmission on a "physical" channel (e.g., a control channel or a data channel) that does not employ error detection coding are described herein. Data is transmitted as "codewords" on the physical channel, where each codeword may be a block of coded or uncoded data.

For erasure detection, a transmitting entity (e.g., a wireless terminal) transmits codewords on the physical channel and via a wireless channel to a receiving entity (e.g., a base station). The base station computes a metric for each received codeword, as described below, and compares the computed metric against an erasure threshold. The base station declares each received codeword to be an "erased" codeword or a "non-erased" codeword based on the comparison result. The base station dynamically adjusts the erasure threshold to achieve a target level of performance, which may be quantified by a target conditional error rate that indicates the probability of a received codeword being decoded in error when declared to be a non-erased codeword. The erasure threshold may be adjusted based on received known codewords, which are received codewords for known codewords transmitted by terminals in communication with the base station, as described below. The adjustable erasure threshold can provide robust erasure detection performance in various channel conditions.

A power control mechanism with three loops (an inner loop, an outer loop, and a third loop) may be used to control the transmit power for the physical channel. The inner loop adjusts the transmit power for the physical channel to maintain the received SNR at or near a target SNR. The outer loop adjusts the target SNR based on the status of received codewords (erased or non-erased) to achieve a target erasure rate, which is the probability of declaring a received codeword as an erased codeword. The third loop adjusts the erasure threshold based on the status of received known codewords ("good", "bad", or erased) to achieve the target conditional error rate. The target erasure rate and the target conditional error rate are two measures of performance for the physical channel.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
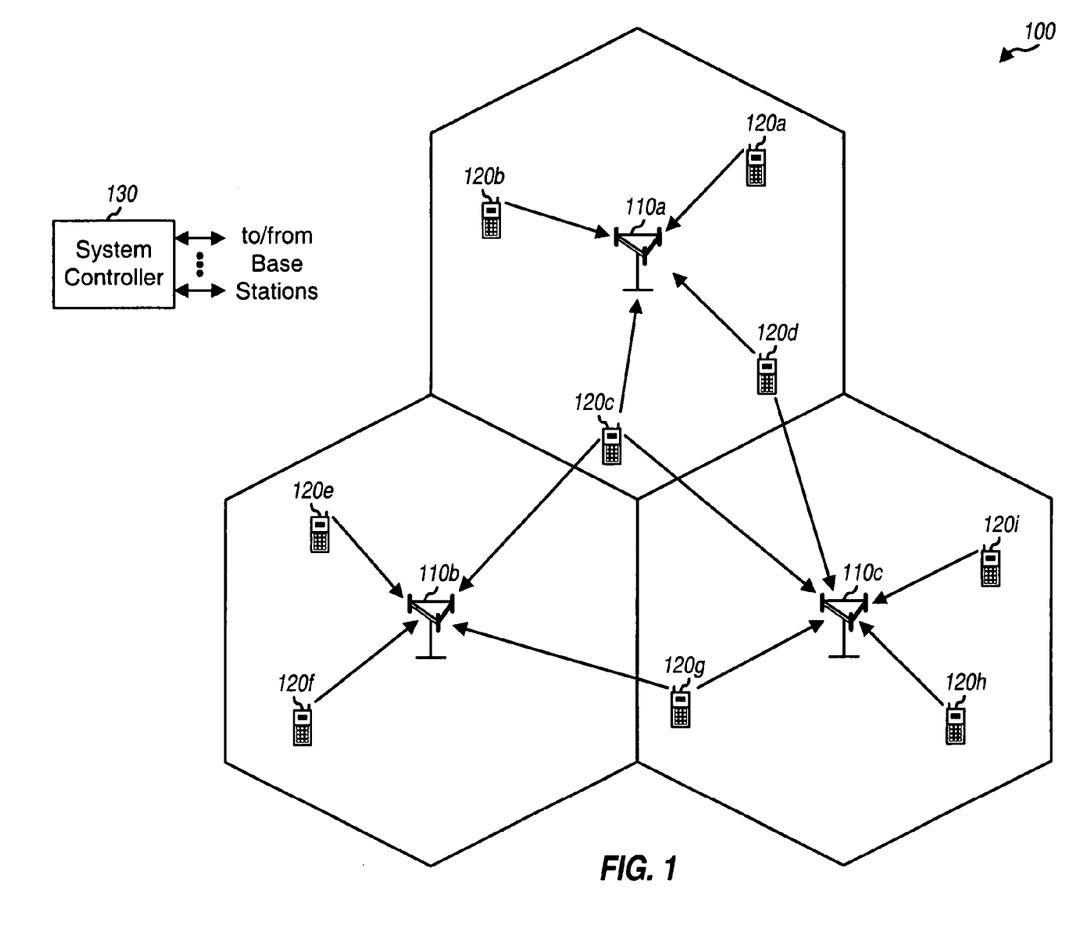
FIG. 1 shows a wireless multiple-access communication system.

FIG. 1 shows a wireless multiple-access communication system 100. System 100 includes a number of base stations 110 that support communication for a number of wireless terminals 120. A base station is a fixed station used for communicating with the terminals and may also be referred to as an access point, a Node B, or some other terminology. Terminals 120 are typically dispersed throughout the system, and each terminal may be fixed or mobile. A terminal may also be referred to as a mobile station, a user equipment (UE), a wireless communication device, or some other terminology. Each terminal may communicate with one or more base stations on the forward and reverse links at any given moment. This depends on whether the terminal is active, whether soft handoff is supported, and whether the terminal is in soft handoff. For simplicity, FIG. 1 only shows transmissions on the reverse link. A system controller 130 couples to base stations 110, provides coordination and control for these base stations, and further controls the routing of data for the terminals served by these base stations.

The erasure detection and power control techniques described herein may be used for various wireless communication systems. For example, these techniques may be used for a Code Division Multiple Access (CDMA) system, a Time Division Multiple Access (TDMA) system, a Frequency Division Multiple Access (FDMA) system, an orthogonal frequency division multiple access (OFDMA) system, and so on. A CDMA system uses code division multiplexing, and transmissions for different terminals are orthogonalized by using different orthogonal (e.g., Walsh) codes for the forward link. The terminals use different pseudo-random number (PN) sequences for the reverse link in CDMA and are not completely orthogonal to one another. A TDMA system uses time division multiplexing, and transmissions for different terminals are orthogonalized by transmitting in different time intervals. An FDMA system uses frequency division multiplexing, and the transmissions for different terminals are orthogonalized by transmitting in different frequency subbands. An OFDMA system utilizes orthogonal frequency division multiplexing (OFDM), which effectively partitions the overall system bandwidth into a number of orthogonal frequency subbands. These subbands are also commonly referred to as tones, sub-carriers, bins, and frequency channels. An OFDMA system may use various orthogonal multiplexing schemes and may employ any combination of time, frequency, and/or code division multiplexing.

The techniques described herein may be used for various types of "physical" channels that do not employ error detection coding. The physical channels may also be referred to as code channels, transport channels, or some other terminology. The physical channels typically include "data" channels used to send traffic/packet data and "control" channels used to send overhead/control data. A system may employ different control channels to send different types of control information. For example, a system may use (1) a CQI channel to send channel quality indicators (CQI) indicative of the quality of a wireless channel, (2) an ACK channel to send acknowledgments (ACK) for a hybrid automatic retransmission (H-ARQ) scheme, (3) a REQ channel to send requests for data transmission, and so on. The physical channels may or may not employ other types of coding, even though error detection coding is not used. For example, a physical channel may not employ any coding, and data is sent "in the clear" on the physical channel. A physical channel may also employ block coding so that each block of data is coded to obtain a corresponding block of coded data, which is then sent on the physical channel. The techniques described herein may be used for any and all of these different physical (data and control) channels.

For clarity, the erasure detection and power control techniques are specifically described below for an exemplary control channel used for the reverse link. Transmissions from different terminals on this control channel may be orthogonally multiplexed in frequency, time, and/or code space. With complete orthogonality, no interference is observed by each terminal on the control channel. However, in the presence of frequency selective fading (or variation in frequency response across the system bandwidth) and Doppler (due to movement), the transmissions from different terminals may not be orthogonal to one another at a receiving base station.

Data is sent in blocks on the exemplary control channel, with each block containing a predetermined number of (L) data bits. Each data block is coded with a block code to obtain a corresponding codeword or coded data block. Since each data block contains L bits, there are $2^L$ possible different data blocks that are mapped to $2^L$ possible codewords in a codebook, one codeword for each different data block. The terminals transmit codewords for the data blocks on the control channel.

A base station receives the codewords transmitted on the control channel by different terminals. The base station performs the complementary block decoding on each received codeword to obtain a decoded data block, which is a data block deemed most likely to have been transmitted for the received codeword. The block decoding may be performed in various manners. For example, the base station may compute a Euclidean distance between the received codeword and each of the $2^L$ possible valid codewords in the codebook. In general, the Euclidean distance between the received codeword and a given valid codeword is shorter the closer the received codeword is to the valid codeword, and is longer the farther away the received codeword is from the valid codeword. The data block corresponding to the valid codeword with the shortest Euclidean distance to the received codeword is provided as the decoded data block for the received codeword.

As an example, the L data bits for a data block may be mapped to a codeword containing K modulation symbols for a particular modulation scheme (e.g., BPSK, QPSK, M-PSK, M-QAM, and so on). Each valid codeword is associated with a different set of K modulation symbols, and the $2^L$ sets of modulation symbols for the $2^L$ possible valid codewords may be selected to be as far apart (in Euclidean distance) from each other as possible. A received codeword would then contain K received symbols, where each received symbol is a noisy version of a transmitted modulation symbol. The Euclidean distance between the received codeword and a given valid codeword may be computed as:

$$d_i(k) = \frac{1}{K}\sum_{j=1}^{K}(\hat{s}_k(j) - s_i(j))^2, \quad \text{Eq (1)}$$

where $\hat{s}_k(j)$ is the j-th received symbol for received codeword k;

$s_i(j)$ is the j-th modulation symbol for valid codeword i; and $d_i(k)$ is the Euclidean distance between received codeword k and valid codeword i.

Equation (1) computes the Euclidean distance as the mean-squared error between the K received symbols for the received codeword and the K modulation symbols for the valid codeword. The data block corresponding to the valid codeword with the smallest $d_i(k)$ is provided as the decoded data block for the received codeword.

Without an error detection code, there is no direct way to determine whether the block decoding of a given received codeword is correct or in error, and that the decoded data block is indeed the transmitted data block. A metric may be defined and used to provide an indication of the confidence in the decoding result. In an embodiment, a metric may be defined as follows:

$$m(k) = \frac{d_{n1}(k)}{d_{n2}(k)}, \quad \text{Eq (2)}$$

where $d_{n1}(k)$ is the Euclidean distance between received codeword k and the nearest valid codeword;

$d_{n2}(k)$ is the Euclidean distance between received codeword k and the next nearest valid codeword; and m(k) is the metric for received codeword k.

If the received codeword is much closer to the nearest codeword than the next nearest codeword, then the metric m(k) is a small value and there is a high degree of confidence that the decoded data block is correct. Conversely, if the received codeword has approximately equal distance to the nearest codeword and the next nearest codeword, then the metric m(k) approaches one, or m(k)→1, and there is less confidence that the decoded data block is correct.

Equation (2) shows one exemplary metric that is based on the ratio of Euclidean distances and which may be used to determine whether the block decoding of a given received codeword is correct or in error. Other metrics may also be used for erasure detection, and this is within the scope of the invention. In general, a metric may be defined based on any suitable reliability function $f(r,C)$, where r is a received codeword and C is a codebook or collection of all possible codewords. The function $f(r,C)$ should be indicative of the quality/reliability of a received codeword and should have the proper characteristic (e.g., monotonic with detection reliability).

Erasure detection may be performed to determine whether the decoding result for each received codeword meets a predetermined level of confidence. The metric m(k) for a received codeword may be compared against an erasure threshold, $TH_{erasure}$, to obtain a decoding decision for the received codeword, as follows:

m(k)<$TH_{erasure}$, declare a non-erased codeword, m(k)≥$TH_{erasure}$, declare an erased codeword. Eq (3)

As shown in equation (3), the received codeword is declared as (1) an "erased" codeword if the metric m(k) is equal to or greater than the erasure threshold and (2) a "non-erased" codeword if the metric m(k) is less than the erasure threshold. The base station may treat decoded data blocks for non-erased and erased codewords differently. For example, the base station may use decoded data blocks for non-erased codewords for subsequent processing and may discard decoded data blocks for erased codewords.

The probability of declaring a received codeword as an erased codeword is called an erasure rate and is denoted as $Pr_{erasure}$. The erasure rate is dependent on the erasure threshold used for erasure detection and the received signal quality (SNR) for the received codeword. The signal quality may be quantified by a signal-to-noise ratio, a signal-to-noise-and-interference ratio, and so on. For a given received SNR, a low erasure threshold increases the likelihood of a received codeword being declared an erased codeword, and vice versa. For a given erasure threshold, a low received SNR also increases the likelihood of a received codeword being declared an erased codeword, and vice versa. For a given erasure threshold, the received SNR may be set (by controlling the transmit power for the control channel, as described below) to achieve the desired erasure rate.

The erasure threshold may be set to achieve the desired performance for the control channel. For example, a probability of error conditioned on non-erased codewords, which is called a conditional error rate, may be used for the control channel. This conditional error rate is denoted as $Pr_{error}$ and means the following: given that a received codeword is declared to be a non-erased codeword, the probability of the decoded data block for the received codeword being incorrect is $Pr_{error}$. A low $Pr_{error}$ (e.g., 1% or 0.1%) corresponds to a high degree of confidence in the decoding result when a non-erased codeword is declared. A low $Pr_{error}$ may be desirable for many types of transmission where reliable decoding is important. The erasure threshold may be set to the proper level to achieve the desired $Pr_{error}$.

A well-defined relationship may be expected to exist between the erasure rate $Pr_{erasure}$, the conditional error rate $Pr_{error}$, the erasure threshold $TH_{erasure}$, and the received SNR. In particular, for a given erasure threshold and a given received SNR, there exists a specific erasure rate and a specific conditional error rate. By changing the erasure threshold, a trade off may be made between the erasure rate and the conditional error rate. Computer simulation may be performed and/or empirical measurements may be made to determine or predict the relationship between the erasure rate and the conditional error rate for different erasure threshold values and different received SNRs.

However, in a practical system, the relationship between these four parameters may not be known in advance and may be dependent on deployment scenarios. For example, the specific erasure threshold that can achieve the desired erasure rate and conditional error rate may not be known a priori and may even change over time, but probably slowly. Furthermore, it is not known whether "predicted" relationship between the erasure rate and the conditional error rate, obtained via simulation or by some other means, will hold true in an actual deployment.

A power control mechanism may be used to dynamically adjust the erasure threshold and the received SNR to achieve the desired performance for the control channel. The control channel performance may be quantified by a target erasure rate $Pr_{erasure}$ (e.g., 10% erasure rate, or $Pr_{erasure}$=0.1) and a target conditional error rate $Pr_{error}$ (e.g., 1% conditional error rate, or $Pr_{error}$=0.01), i.e., a ($Pr_{erasure}$, $Pr_{error}$) pair.

Figure 2:
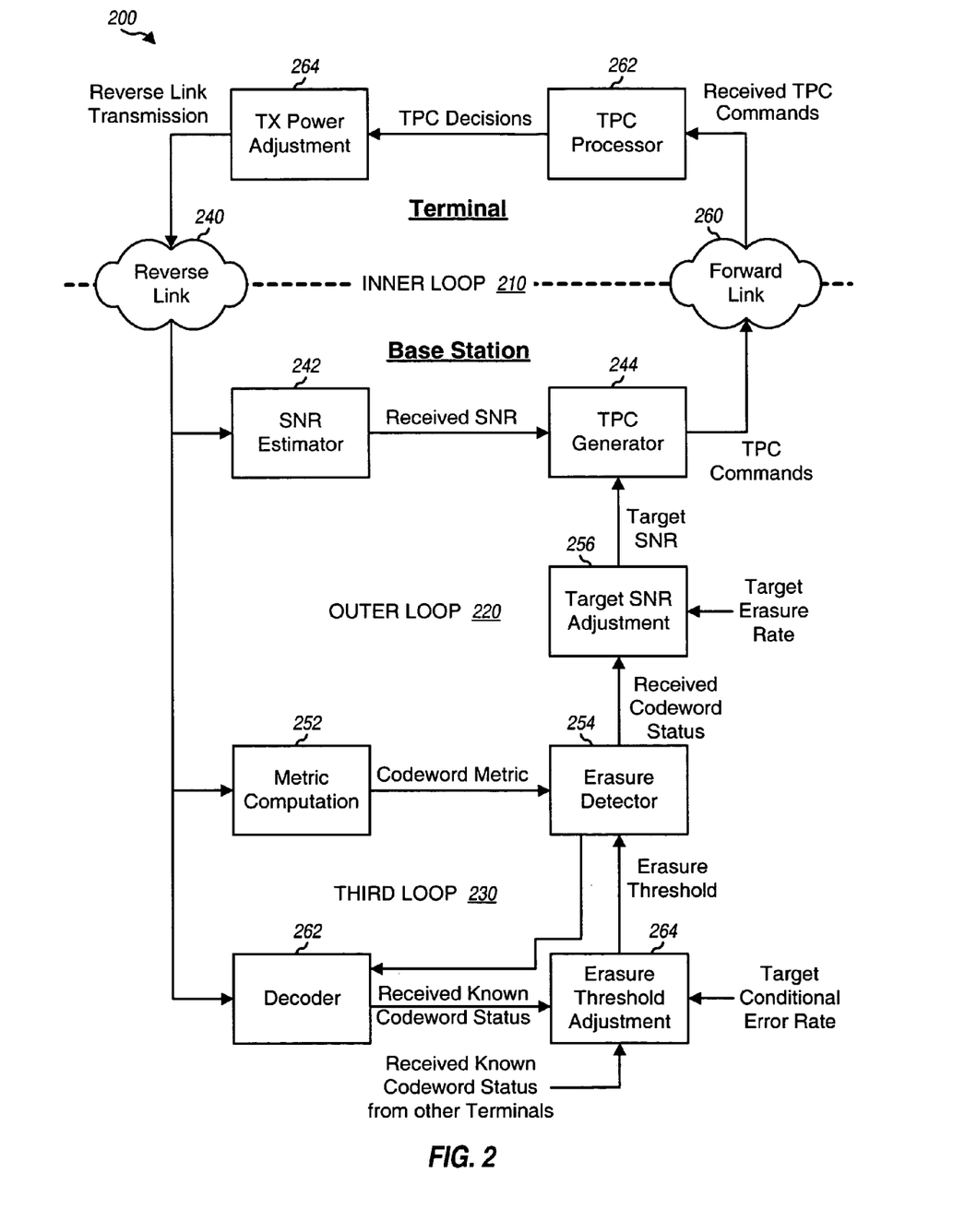
FIG. 2 shows a power control mechanism with three loops.

FIG. 2 shows a power control mechanism 200 that may be used to dynamically adjust the erasure threshold and to control the transmit power for a transmission sent on the control channel from a terminal to a base station. Power control mechanism 200 includes an inner loop 210, an outer loop 220, and a third loop 230.

Inner loop 210 attempts to maintain the received SNR for the transmission, as measured at the base station, as close as possible to a target SNR. For inner loop 210, an SNR estimator 242 at the base station estimates the received SNR for the transmission and provides the received SNR to a transmit power control (TPC) generator 244. TPC generator 244 also receives the target SNR for the control channel, compares the received SNR against the target SNR, and generates TPC commands based on the comparison results. Each TPC command is either (1) an UP command to direct an increase in transmit power for the control channel or (2) a DOWN command to direct a decrease in transmit power. The base station transmits the TPC commands on the forward link (cloud 260) to the terminal.

The terminal receives and processes the forward link transmission from the base station and provides "received" TPC commands to a TPC processor 262. Each received TPC command is a noisy version of a TPC command sent by the base station. TPC processor 262 detects each received TPC command and obtains a TPC decision, which may be (1) an UP decision if the received TPC command is deemed to be an UP command or (2) a DOWN decision if the received TPC command is deemed to be a DOWN command.

A transmit (TX) power adjustment unit 264 adjusts the transmit power for the transmission on the control channel based on the TPC decisions from TPC processor 262. Unit 264 may adjust the transmit power as follows:

$$P_{cch}(n+1) = \begin{cases} P_{cch}(n) + \Delta P_{up} & \text{for an UP decision,} \\ P_{cch}(n) - \Delta P_{dn} & \text{for a DOWN decision,} \end{cases} \quad \text{Eq (4)}$$

where $P_{cch}(n)$ is the transmit power for inner loop update interval n; $\Delta P_{up}$ is an up step size for the transmit power; and $\Delta P_{dn}$ is a down step size for the transmit power.

The transmit power $P_{cch}(n)$ and step sizes $\Delta P_{up}$ and $\Delta P_{dn}$ are in units of decibels (dB). As shown in equation (4), the transmit power is increased by $\Delta P_{up}$ for each UP decision and decreased by $\Delta P_{dn}$ for each DOWN decision. Although not described above for simplicity, a TPC decision may also be a "no-OP" decision if a received TPC command is deemed to be too unreliable, in which case the transmit power may be maintained at the same level, or $P_{cch}(n+1)=P_{cch}(n)$. The $\Delta P_{up}$ and $\Delta P_{dn}$ step sizes are typically equal, and may both be set to 1.0 dB, 0.5 dB, or some other value.

Due to path loss, fading, and multipath effects on the reverse link (cloud 240), which typically vary over time and especially for a mobile terminal, the received SNR for the transmission on the control channel continually fluctuates. Inner loop 210 attempts to maintain the received SNR at or near the target SNR in the presence of changes in the reverse link channel condition.

Outer loop 220 continually adjusts the target SNR such that the target erasure rate is achieved for the control channel. A metric computation unit 252 computes the metric m(k) for each received codeword obtained from the control channel, as described above. An erasure detector 254 performs erasure detection for each received codeword based on the computed metric m(k) for the codeword and the erasure threshold and provides the status of the received codeword (either erased or non-erased) to a target SNR adjustment unit 256.

Target SNR adjustment unit 256 obtains the status of each received codeword and adjusts the target SNR for the control channel, as follows:

$$SNR_{target}(k+1) = \begin{cases} SNR_{target}(k) + \Delta SNR_{up}, & \text{for an erased codeword,} \\ SNR_{target}(k) - \Delta SNR_{dn}, & \text{for a non-erased codeword,} \end{cases} \quad \text{Eq (5)}$$

where $SNR_{target}(k)$ is the target SNR for outer loop update interval k;

$\Delta SNR_{up}$ is an up step size for the target SNR; and $\Delta SNR_{dn}$ is a down step size for the target SNR.

The target SNR $SNR_{target}(k)$ and the step sizes $\Delta SNR_{up}$ and $\Delta SNR_{dn}$ are in units of dB. As shown in equation (5), unit 256 reduces the target SNR by $\Delta SNR_{dn}$ if a received codeword is deemed to be a non-erased codeword, which may indicate that the received SNR for the control channel is higher than necessary. Conversely, unit 256 increases the target SNR by $\Delta SNR_{up}$ if a received codeword is deemed to be an erased codeword, which may indicate that the received SNR for the control channel is lower than necessary.

The $\Delta SNR_{up}$ and $\Delta SNR_{dn}$ step sizes for adjusting the target SNR may be set based on the following relationship:

$$\Delta SNR_{up} = \Delta SNR_{dn} \cdot \left( \frac{1 - Pr_{erasure}}{Pr_{erasure}} \right). \quad \text{Eq (6)}$$

For example, if the target erasure rate for the control channel is 10% (or $Pr_{erasure}=0.1$), then the up step size is 9 times the down step size (or $\Delta SNR_{up}=9 \cdot \Delta SNR_{dn}$). If the up step size is selected to be 0.5 decibel (dB), then the down step size is approximately 0.056 dB. Larger values for $\Delta SNR_{up}$ and $\Delta SNR_{dn}$ speed up the convergence rate for outer loop 220. A large value for $\Delta SNR_{up}$ also causes more fluctuation or variation of the target SNR at steady state.

Third loop 230 dynamically adjusts the erasure threshold such that the target conditional error rate is achieved for the control channel. The terminal may transmit a known codeword on the control channel periodically or whenever triggered. The base station receives the transmitted known codeword. Metric computation unit 252 and erasure detector 254 perform erasure detection for each received known codeword based on the erasure threshold and in the same manner as for the received codewords. For each received known codeword deemed to be non-erased, a decoder 262 decodes the received known codeword and determines whether the decoded data block is correct or in error, which can be done since the codeword is known. Decoder 262 provides to an erasure threshold adjustment unit 264 the status of each received known codeword, which may be: (1) an erased codeword, (2) a "good" codeword if the received known codeword is a non-erased codeword and decoded correctly, or (3) a "bad" codeword if the received known codeword is a non-erased codeword but decoded in error.

Erasure threshold adjustment unit 264 obtains the status of the received known codewords and adjusts the erasure threshold, as follows:

$$TH_{erasure}(l+1) = \begin{cases} TH_{erasure}(l) + \Delta TH_{up}, & \text{for a good codeword,} \\ TH_{erasure}(l) - \Delta TH_{dn}, & \text{for a bad codeword, and} \\ TH_{erasure}(l), & \text{for an erased codeword,} \end{cases} \quad \text{Eq (7)}$$

where $TH_{erasure}(l)$ is the erasure threshold for third loop update interval l;

$\Delta TH_{up}$ is an up step size for the erasure threshold; and $\Delta TH_{dn}$ is a down step size for the erasure threshold.

As shown in equation (7), the erasure threshold is decreased by $\Delta TH_{dn}$ for each received known codeword that is a bad codeword. The lower erasure threshold corresponds to a more stringent erasure detection criterion and results in a received codeword being more likely to be deemed erased, which in turn results in the received codeword being more likely to be decoded correctly when deemed to be non-erased. Conversely, the erasure threshold is increased by $\Delta TH_{up}$ for each received known codeword that is a good codeword. The higher erasure threshold corresponds to a less stringent erasure detection criterion and results in a received codeword being less likely to be deemed erased, which in turn results in the received codeword being more likely to be decoded in error when deemed to be non-erased. The erasure threshold is maintained at the same level for received known codewords that are erased.

The $\Delta TH_{up}$ and $\Delta TH_{dn}$ step sizes for adjusting the erasure threshold may be set based on the following relationship:

$$\Delta TH_{dn} = \Delta TH_{up} \cdot \left( \frac{1 - Pr_{error}}{Pr_{error}} \right). \quad \text{Eq (8)}$$

For example, if the target conditional error rate for the control channel is 1%, then the down step size is 99 times the up step size. The magnitude of $\Delta TH_{up}$ and $\Delta TH_{dn}$ may be determined based on the expected magnitude of the received symbols, the desired convergence rate for the third loop, and possibly other factors.

In general, the adjustment of the erasure threshold is dependent on how the metric used for erasure detection is defined. Equations (7) and (8) are based on the metric defined as shown in equation (2). The metric may also be defined in other manners (e.g., $m(k)=d_{n2}(k)/d_{n1}(k)$ instead of $m(k)=d_{n1}(k)/d_{n2}(k)$), in which case the adjustment of the erasure threshold may be modified accordingly. The adjustable erasure threshold may also be used in combination with any erasure detection technique to achieve robust erasure detection performance for various channel conditions.

The erasure threshold, $TH_{erasure}(l)$, may be dynamically adjusted in various manners. In one embodiment, a separate third loop is maintained by the base station for each terminal in communication with the base station. This embodiment allows the erasure threshold to be individually adjusted for each terminal, which then allows the control channel performance to be specifically tailored for the terminal. For example, different terminals may have different target conditional error rates, which may be achieved by operating separate third loops for these terminals. In another embodiment, a single third loop is maintained by the base station for all terminals in communication with the base station. The common erasure threshold is then used for erasure detection for all of these terminals and is also updated based on known codewords received by the base station from these terminals. This embodiment provides good performance for all terminals if the control channel performance is robust for these terminals for various channel conditions. This embodiment allows for a faster rate of convergence for the third loop and also reduces overhead since each terminal may transmit the known codeword at a lower rate (e.g., once every few hundred milli-seconds). In yet another embodiment, a single third loop is maintained by the base station for each group of terminals having the same control channel performance, and the erasure threshold is updated based on known codewords received by the base station from all terminals in the group.

Inner loop 210, outer loop 220, and third loop 230 are typically updated at different rates. Inner loop 210 is the fastest loop of the three loops, and the transmit power for the control channel may be updated at a particular rate (e.g., 150 times per second). Outer loop 220 is the next fastest loop, and the target SNR may be updated whenever a codeword is received on the control channel. Third loop 230 is the slowest loop, and the erasure threshold may be updated whenever a known codeword is received on the control channel. The update rates for the three loops may be selected to achieve the desired performance for erasure detection and power control.

For the embodiment described above, the target conditional error rate $Pr_{error}$ is used as one of the measures of performance for the control channel, and the third loop is designed to achieve this $Pr_{error}$. Other measures of performance may also be used for the control channel, and the third loop may be designed accordingly. For example, a target probability of a received codeword being decoded in error when deemed to be erased may be used for the third loop.

Figure 3A:
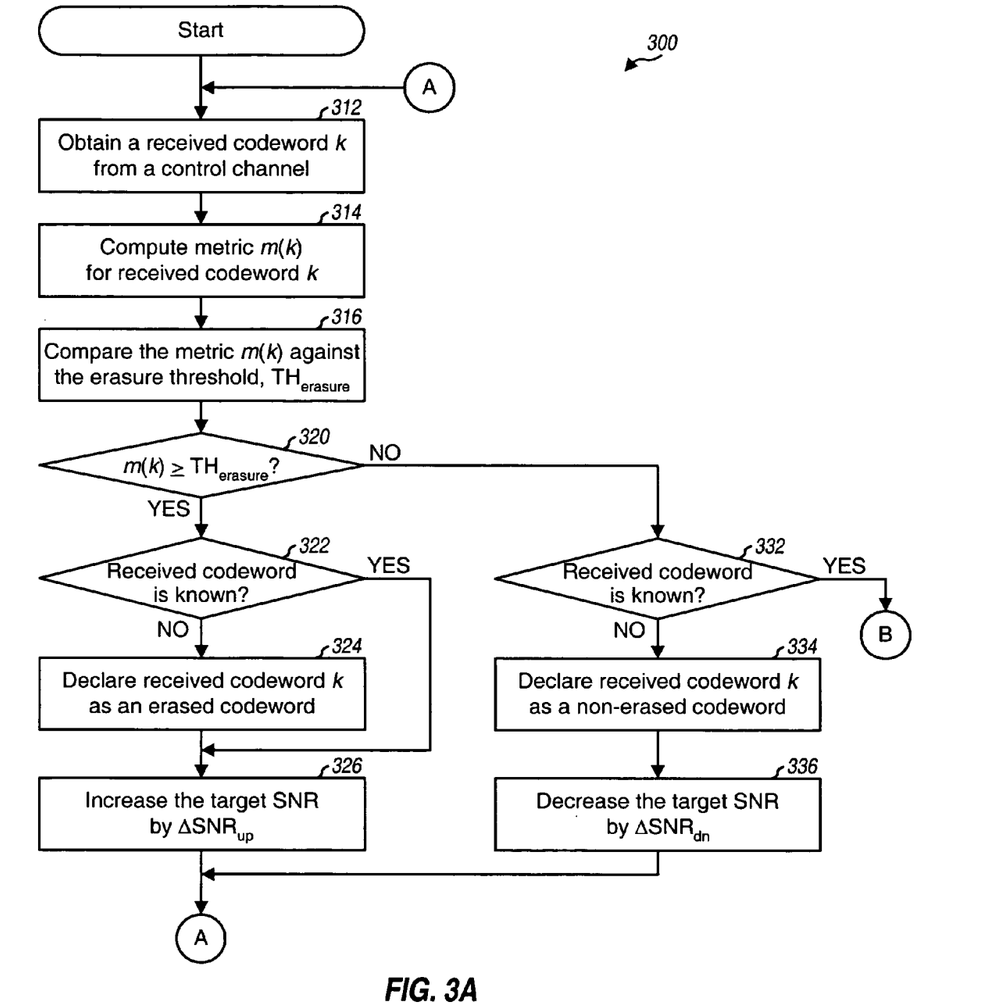
FIGS. 3A and 3B show a process for updating the second and third loops for the power control mechanism shown in FIG. 2.
Figure 3B:
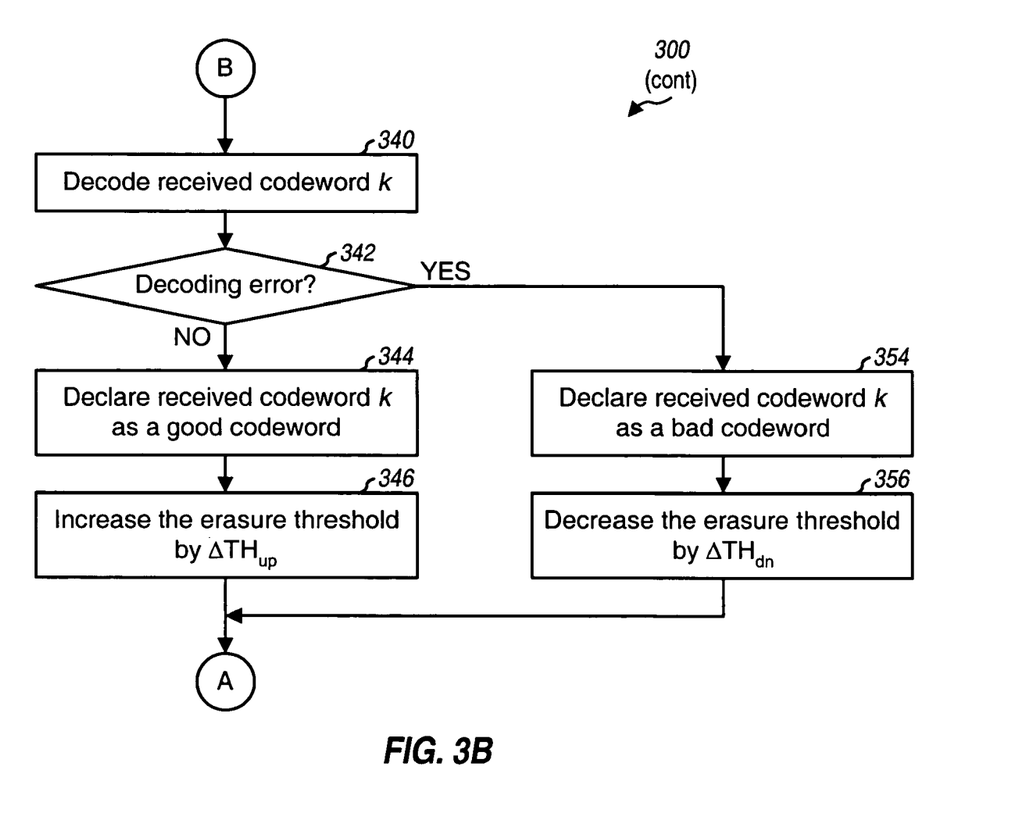

FIGS. 3A and 3B show a flow diagram of a process 300 for updating the second and third loops of power control mechanism 300. A received codeword k is initially obtained from the control channel (block 312). The metric m(k) is computed for the received codeword, e.g., as described above, (block 314) and compared against the erasure threshold (block 316). If the computed metric m(k) is greater than or equal to the erasure threshold, as determined in block 320, and if the received codeword is not a known codeword, as determined in block 322, then the received codeword is declared as an erased codeword (block 324). The target SNR is increased by the $\Delta SNR_{up}$ step size if the computed metric m(k) is greater than or equal to the erasure threshold, regardless of whether the received codeword is known or not known (block 326). After block 326, the process returns to block 312 to process the next received codeword.

If the computed metric m(k) is less than the erasure threshold, as determined in block 320, and if the received codeword is not a known codeword, as determined in block 332, then the received codeword is declared as a non-erased codeword (block 334), and the target SNR is decreased by the $\Delta SNR_{dn}$ step size (block 336). The process returns to block 312 to process the next received codeword.

If the computed metric m(k) is less than the erasure threshold, as determined in block 320, and if the received codeword is a known codeword, as determined in block 332, then (referring to FIG. 3B) the received codeword is decoded (block 340). If the decoding was correct, as determined in block 342, then the received known codeword is declared as a good codeword (block 344), and the erasure threshold is increased by the $\Delta TH_{up}$ step size (block 346). Otherwise, if there was a decoding error, as determined in block 342, then the received known codeword is declared as a bad codeword (block 354), and the erasure threshold is decreased by the $\Delta TH_{dn}$ step size (block 356). From blocks 346 and 356, the process returns to block 312 in FIG. 3A to process the next received codeword.

As noted above, the techniques described herein may be used for various types of physical channels that do not employ error detection coding. The use of these techniques for an exemplary data transmission scheme is described below. For this transmission scheme, a terminal desiring a forward link transmission estimates the received signal quality of the forward link for its serving base station (e.g., based on a pilot transmitted by the base station). The received signal quality estimate may be translated to an L-bit value, which is called a channel quality indicator (CQI). The CQI may indicate the received SNR for the forward link, the supported data rate for the forward link, and so on. In any case, block coding is performed on the CQI to obtain a CQI codeword. As a specific example, L may be equal to 4, and the CQI codeword may contain 16 QPSK modulation symbols, or $[s_i(1) \, s_i(2) \ldots s_i(16)]$. The terminal transmits the CQI codeword on the CQI channel (which is one of the control channels) to the serving base station. The serving base station receives the CQI codeword sent on the CQI channel and performs erasure detection on the received CQI codeword. If the received CQI codeword is not erased, then the serving base station decodes the received CQI codeword and uses the decoded CQI to schedule a data transmission for the terminal.

Figure 4:
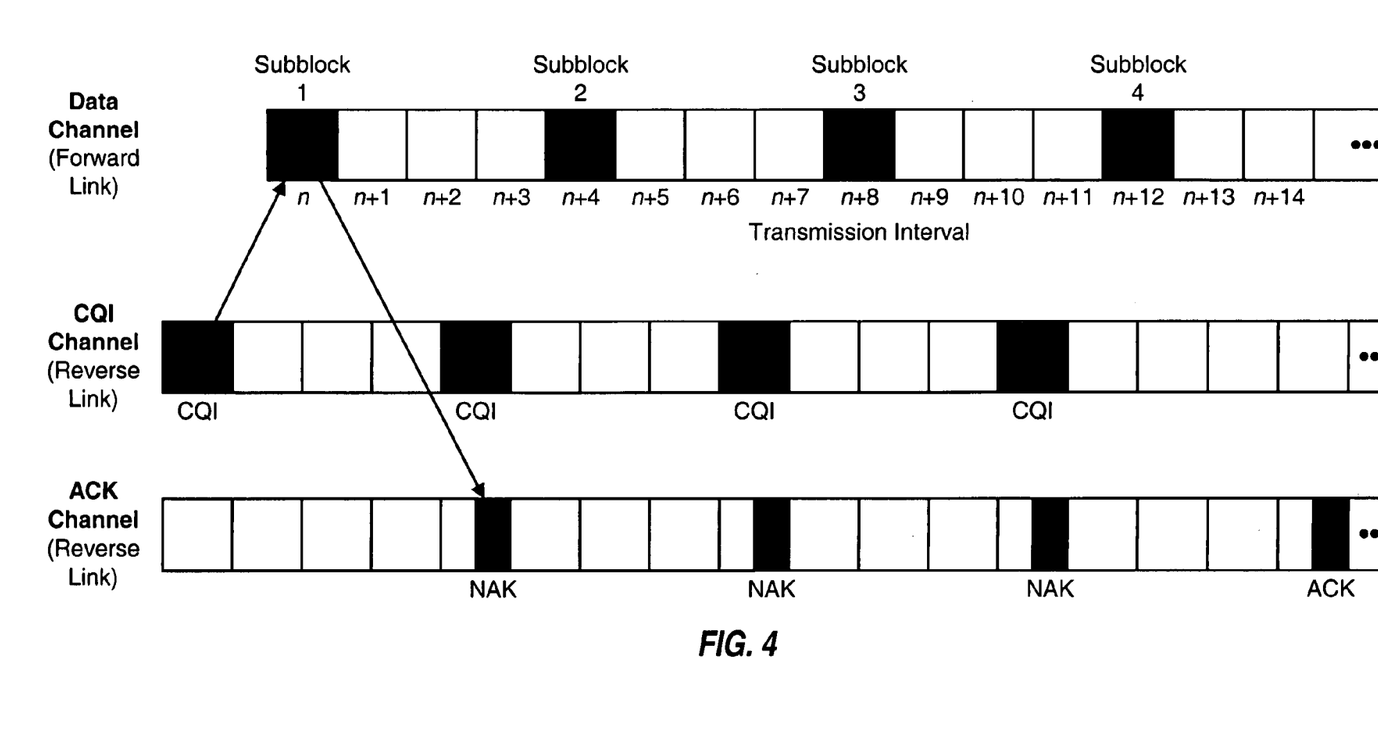
FIG. 4 shows data and control channels for a data transmission scheme.

FIG. 4 shows a set of data and control channels used for the exemplary data transmission scheme. The terminal measures the received signal quality of the forward link and transmits a CQI codeword on the CQI channel. The terminal continually makes measurements of the forward link quality and sends updated CQI codewords on the CQI channel. Thus, discarding received CQI codewords deemed to be erased is not detrimental to system performance. However, received CQI codewords deemed to be non-erased should be of high quality since a forward link transmission may be scheduled based on the information contained in these non-erased CQI codewords.

If the terminal is scheduled for forward link transmission, then the serving base station processes data packets to obtain coded packets and transmits the coded packets on a forward link data channel to the terminal. For a hybrid automatic retransmission (H-ARQ) scheme, each coded packet is partitioned into multiple subblocks, and one subblock is transmitted at a time for the coded packet. As each subblock for a given coded packet is received on the forward link data channel, the terminal attempts to decode and recover the packet based on all subblocks received thus far for the packet. The terminal is able to recover the packet based on a partial transmission because the subblocks contain redundant information that is useful for decoding when the received signal quality is poor but may not be needed when the received signal quality is good. The terminal then transmits an acknowledgment (ACK) on an ACK channel if the packet is decoded correctly, or a negative acknowledgment (NAK) otherwise. The forward link transmission continues in this manner until all coded packets are transmitted to the terminal.

The techniques described herein may be advantageously used for the CQI channel. Erasure detection may be performed on each received CQI codeword as described above. The transmit power for the CQI channel may be adjusted using power control mechanism 300 to achieve the desired performance for the CQI channel (e.g., the desired erasure rate and the desired conditional error rate). The transmit power for other control channels (e.g., the ACK channel) and reverse link data channels may also be set based on the power-controlled transmit power for the CQI channel.

For clarity, the erasure detection and power control techniques have been specifically described for the reverse link. These techniques may also be used for erasure detection and power control for a transmission sent on the forward link.

Figure 5:
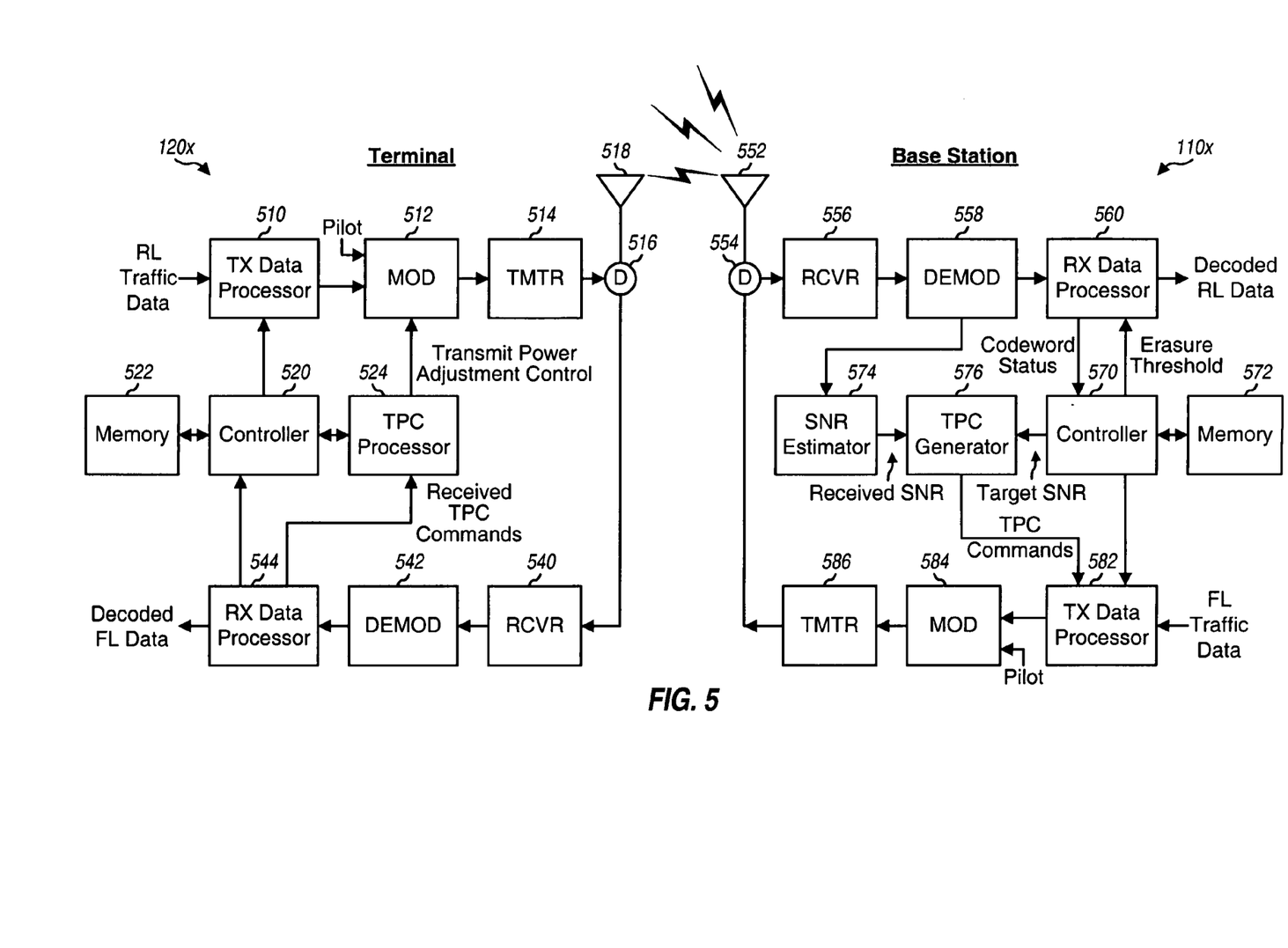
FIG. 5 shows a block diagram of a base station and a terminal.

FIG. 5 shows a block diagram of an embodiment of a base station 110x and a terminal 120x. On the reverse link, at terminal 120x, a transmit (TX) data processor 510 receives and processes (e.g., formats, codes, interleaves, and modulates) reverse link (RL) traffic data and provides modulation symbols for the traffic data. TX data processor 510 also processes control data (e.g., CQI) from a controller 520 and provides modulation symbols for the control data. A modulator (MOD) 512 processes the modulation symbols for traffic and control data and pilot symbols and provides a sequence of complex-valued chips. The processing by TX data processor 510 and modulator 512 is dependent on the system. For example, modulator 512 may perform OFDM modulation if the system utilizes OFDM. A transmitter unit (TMTR) 514 conditions (e.g., converts to analog, amplifies, filters, and frequency upconverts) the sequence of chips and generates a reverse link signal, which is routed through a duplexer (D) 516 and transmitted via an antenna 518.

At base station 110x, the reverse link signal from terminal 120x is received by an antenna 552, routed through a duplexer 554, and provided to a receiver unit (RCVR) 556. Receiver unit 556 conditions (e.g., filters, amplifies, and frequency downconverts) the received signal and further digitizes the conditioned signal to obtain a stream of data samples. A demodulator (DEMOD) 558 processes the data samples to obtain symbol estimates. A receive (RX) data processor 560 then processes (e.g., deinterleaves and decodes) the symbol estimates to obtain decoded data for terminal 120x. RX data processor 560 also performs erasure detection and provides to a controller 570 the status of each received codeword used for power control. The processing by demodulator 558 and RX data processor 560 is complementary to the processing performed by modulator 512 and TX data processor 510, respectively.

The processing for a forward link transmission may be performed similarly to that described above for the reverse link. The processing for reverse link and forward link transmissions is typically specified by the system.

For reverse link power control, an SNR estimator 574 estimates the received SNR for terminal 120x and provides the received SNR to a TPC generator 576. TPC generator 576 also receives the target SNR and generates TPC commands for terminal 120x. The TPC commands are processed by a TX data processor 582, further processed by a modulator 584, conditioned by a transmitter unit 586, routed through duplexer 554, and transmitted via antenna 552 to terminal 120x.

At terminal 120x, the forward link signal from base station 110x is received by antenna 518, routed through duplexer 516, conditioned and digitized by a receiver unit 540, processed by a demodulator 542, and further processed by an RX data processor 544 to obtain received TPC commands. A TPC processor 524 then detects the received TPC commands to obtain TPC decisions, which are used to generate a transmit power adjustment control. Modulator 512 receives the control from TPC processor 524 and adjusts the transmit power for the reverse link transmission. Forward link power control may be achieved in a similar manner.

Controllers 520 and 570 direct the operations of various processing units within terminal 120x and base station 110x, respectively. Controller 520 and 570 may also perform various functions for erasure detection and power control for the forward link and reverse link. For example, each controller may implement the SNR estimator, TPC generator, and target SNR adjustment unit for its link. Controller 570 and RX data processor 560 may also implement process 300 in FIGS. 3A and 3B. Memory units 522 and 572 store data and program codes for controllers 520 and 570, respectively.

The erasure detection and power control techniques described herein may be implemented by various means. For example, these techniques may be implemented in hardware, software, or a combination thereof. For a hardware implementation, the processing units used to perform erasure detection and/or power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory unit 572 in FIG. 5) and executed by a processor (e.g., controller 570). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing erasure detection in a communication system, comprising:
   obtaining received codewords for codewords transmitted via a wireless channel, each transmitted codeword being a block of coded or uncoded data, and each received codeword being a noisy version of a transmitted codeword;
   computing a metric for each of the received codewords;
   comparing the computed metric for each received codeword against an erasure threshold;
   declaring each received codeword to he an erased codeword or a non-erased codeword based on a comparison result for the received codeword; and
   dynamically adjusting the erasure threshold to achieve a target level of performance for erasure detection.

2. The method of claim 1, further comprising:
   obtaining received known codewords for known codewords transmitted via the wireless channel, each known codeword being a block of a known data, and each received known codeword being a noisy version of a transmitted known codeword;
   determining a status of each of the received known codewords as being a good codeword, a bad codeword, or an erased codeword, a good codeword being a received known codeword declared to be a now-erased codeword and decoded correctly, and a bad codeword being a received known codeword declared to be a now-erased codeword but decoded in error; and adjusting the erasure threshold based on the status of each received known codeword.

3. The method of claim 2, wherein the known codewords are transmitted at known times by one or more transmitting entities.

4. The method of claim 2, wherein the known codewords are transmitted by a transmitting entity when directed.

5. The method of claim 1, wherein a non-erased codeword is associated with a particular level of confidence of being received correctly, and an erased codeword is associated with a particular level of confidence of being received in error.

6. The method of claim 1, wherein the target level of performance for erasure detection is a target conditional error rate indicative of a predetermined probability of a received codeword being decoded in error if declared to be a non-erased codeword.

7. The method of claim 1, wherein each transmitted codeword is one of a plurality of possible valid codewords, and wherein the metric is based on a function indicative of reliability of a received codeword.

8. The method of claim 7, wherein the metric for each received codeword is a ratio of a Euclidean distance to a nearest valid codeword to a Euclidean distance to a next nearest valid codeword, the Euclidean distance to the nearest valid codeword being the Euclidean distance between the received codeword and a valid codeword nearest to the received codeword, and the Euclidean distance to the next nearest valid codeword being the Euclidean distance between the received codeword and a valid codeword next nearest to the received codeword.

9. The method of claim 1, wherein each transmitted codeword is a block of coded data obtained by performing block coding on a block of uncoded data.

10. The method of claim 1, wherein each transmitted codeword does not include an error detection code.

11. An apparatus operable to perform erasure detection in a wireless communication system, comprising:
    a metric computation unit operative to obtain received codewords for codewords transmitted via a wireless channel and to compute a metric for each of the received codewords, wherein each transmitted codeword is a block of coded or uncoded data, and wherein each received codeword is a noisy version of a transmitted codeword;
    an erasure detector operative to compare the computed metric for each received codeword against an erasure threshold and to declare each received codeword to be an erased codeword or a non-erased codeword based on a comparison result for the received codeword; and
    an adjustment unit operative to dynamically adjust the erasure threshold to achieve a target level of performance for erasure detection.

12. The apparatus of claim 11, further comprising:
    a decoder operative to obtain received known codewords for known codewords transmitted via the wireless channel, each known codeword being a block of a known data, and each received known codeword being a noisy version of a transmitted known codeword,
    decode each received known codeword deemed to be a non-erased codeword, and
    determine a status of each received known codeword as being a good codeword, a bad codeword, or an erased codeword, a good codeword being a received known codeword declared to be a non-erased codeword and decoded correctly, and a bad codeword being a received known codeword declared to be a non-erased codeword hut decoded in error, and wherein the adjustment unit is operative to adjust the erasure threshold based on the status of each received known codeword.

13. An apparatus operable to perform erasure detection in a wireless communication system, comprising:

means for obtaining received codewords for codewords transmitted via a wireless channel, each transmitted codeword being a block of coded or uncoded data, and each received codeword being a noisy version of a transmitted codeword;

means for computing a metric for each of the received codewords; means for comparing the computed metric for each received codeword against an erasure threshold;

means for declaring each received codeword to be an erased codeword or a non-erased codeword based on a comparison result for the received codeword; and means for dynamically adjusting the erasure threshold to achieve a target level of performance for erasure detection.

14. The apparatus of claim 13, further comprising:

means for obtaining received known codewords for known codewords transmitted via the wireless channel, each known codeword being a block of a known data, and each received known codeword being a noisy version of a transmitted known codeword;

means for determining a status of each of the received known codewords as being a good codeword, a bad codeword, or an erased codeword, a good codeword being a received known codeword declared to be a non-erased codeword and decoded correctly, and a bad codeword being a received known codeword declared to be a non-erased codeword but decoded in error; and means for adjusting the erasure threshold based on the status of each received known codeword.

15. A method of performing power control for a transmission sent via a wireless channel in a wireless communication system, comprising:

obtaining received codewords for codewords transmitted in the transmission, each transmitted codeword being a block of coded or uncoded data, and each received codeword being a noisy version of a transmitted codeword;

determining a status of each received codeword as being an erased codeword or a non-erased codeword based on a metric computed for the received codeword and an erasure threshold;

adjusting a target signal quality (SNR) based on the status of each received codeword, wherein transmit power for the transmission is adjusted based on the target SNR;

obtaining received known codewords for known codewords transmitted via the wireless channel, each known codeword being a block of a known data, and each received known codeword being a noisy version of a transmitted known codeword;

determining a status of each received known codeword as being a good codeword, a bad codeword, or an erased codeword, a good codeword being a received known codeword deemed to be a non-erased codeword and decoded correctly, and a bad codeword being a received known codeword deemed to be a non-erased codeword but decoded in error; and adjusting the erasure threshold based on the status of each received known codeword.

16. The method of claim 15, wherein the adjusting the target SNR includes decreasing the target SNR by a down step for each received codeword deemed to be a non-erased codeword, and increasing the target SNR by an up step for each received codeword deemed to be an erased codeword.

17. The method of claim 16, wherein the down step and the up step for adjusting the target SNR are determined by a target erasure rate indicative of a predetermined probability of declaring a received codeword as an erased codeword.

18. The method of claim 15, wherein a lower erasure threshold corresponds to a higher likelihood of a received codeword being deemed an erased codeword, and wherein the adjusting the erasure threshold includes decreasing the erasure threshold by a down step for each received known codeword deemed to be a bad codeword, and increasing the erasure threshold by an up step for each received known codeword deemed to be a good codeword.

19. The method of claim 18, wherein the adjusting the erasure threshold further includes maintaining the erasure threshold at same level for each received known codeword deemed to be an erased codeword.

20. The method of claim 18, wherein the down step and the up step for adjusting the erasure threshold are determined by a target conditional error rate indicative of a predetermined probability of a received codeword being decoded in error if declared to be a non-erased codeword.

21. The method of claim 15, wherein the received known codewords are obtained from, a plurality of different transmitting entities.

22. The method of claim 15, further comprising:

estimating a received SNR for the transmission;

comparing the received SNR against the target SNR; and generating commands based on results of the comparing, wherein the commands are used to adjust the transmit power for the transmission.

23. An apparatus operable to perform power control for a transmission sent via a wireless channel in a wireless communication system, comprising:

a data processor operative to obtain received codewords for codewords transmitted in the transmission, each transmitted codeword being a block of coded or uncoded data, and each received codeword being a noisy version of a transmitted codeword, determine a status of each received codeword as being an erased codeword or a non-erased codeword based on a metric computed for the received codeword and an erasure threshold, obtain received known codewords for known codewords transmitted via the wireless channel, each known codeword being a block of a known data, and each received known codeword being a noisy version of a transmitted known codeword, and determine a status of each received known codeword as being a good codeword, a bad codeword, or an erased codeword, a good codeword being a received known codeword deemed to be a non-erased codeword and decoded correctly, and a bad codeword being a received known codeword deemed to be a non-erased codeword but decoded in error; and a controller operative to adjust a target signal quality (SNR) based on the status of each received codeword, wherein transmit power for the transmission is adjusted based on the target SNR, and adjust the erasure threshold based on the status of each received known codeword.

24. The apparatus of claim 23, further comprising:
an SNR estimator operative to estimate a received SNR for the transmission; and a generator operative to compare the received SNR against the target SNR and generate commands used to adjust the transmit power for the transmission.

25. The apparatus of claim 23, wherein the controller is operative to adjust the erasure threshold to achieve a target conditional error rate indicative of a predetermined probability of a received codeword being decoded in error if declared to be a non-erased codeword.

26. The apparatus of claim 23, wherein the controller is operative to adjust the target SNR to achieve a target erasure rate indicative of a predetermined probability of declaring a received codeword as an erased codeword.

27. The apparatus of claim 23, wherein the transmission is for a control channel.

28. The apparatus of claim 27, wherein the control channel is used to send channel quality information, and wherein each transmitted codeword is for a channel quality indicator.

29. The apparatus of claim 23, wherein the received known codewords are obtained from a plurality of different transmitting entities.

30. The apparatus of claim 23 and utilized in a base station.

31. The apparatus of claim 23 and utilized in a wireless terminal.

32. An apparatus operable to perform power control for a transmission sent via a wireless channel in a wireless communication system, comprising:
means for obtaining received codewords for codewords transmitted in the transmission, each transmitted codeword being a block of coded or uncoded data, and each received codeword being a noisy version of a transmitted codeword;
means for determining a status of each received codeword as being an erased codeword or a non-erased codeword based on a metric computed for the received codeword and an erasure threshold;
means for adjusting a target signal quality (SNR) based on the status of each received codeword, wherein transmit power for the transmission is adjusted based on the target SNR; means for obtaining received known codewords for known codewords transmitted via the wireless channel, each known codeword being a block of a known data, and each received known codeword being a noisy version of a transmitted known codeword;
means for determining a status of each received known codeword as being a good codeword, a bad codeword, or an erased codeword, a good codeword being a received known codeword deemed to be a non-erased codeword and decoded correctly, and a bad codeword being a received known codeword deemed to be a non-erased codeword but decoded in error; and means for adjusting the erasure threshold based on the status of each received known codeword.

33. The apparatus of claim 32, further comprising:
means for estimating a received SNR for the transmission;
means for comparing the received SNR against the target SNR; and
means for generating commands based on results of the comparing, wherein the commands are used to adjust die transmit power for the transmission.

* * * * *